Feb. 4, 1941.  A. S. BASSETTE ET AL  2,230,423
ELECTRICAL DISTRIBUTION SYSTEM
Filed Jan. 3, 1938
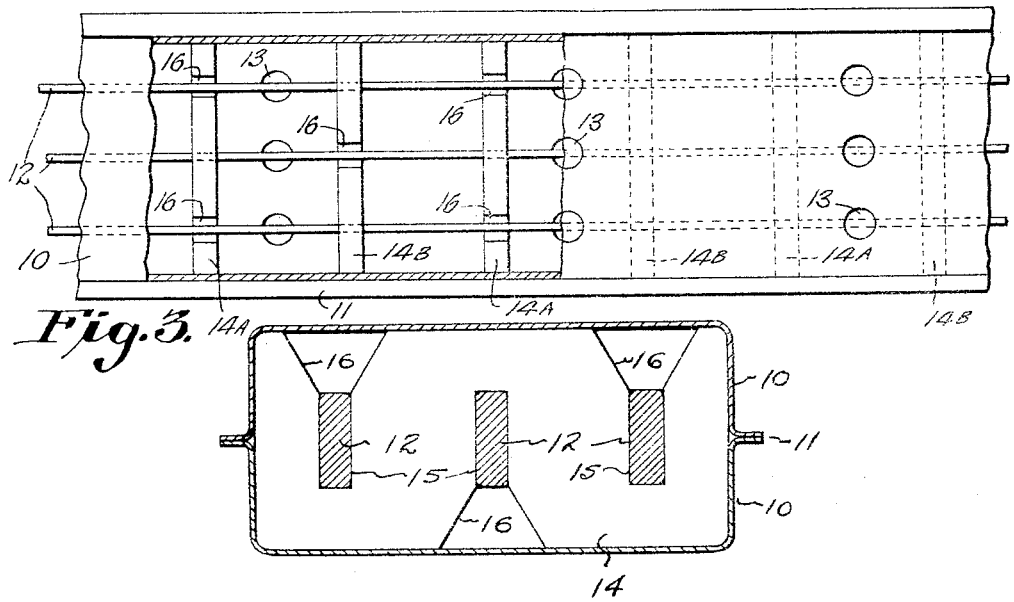
Fig. 3.
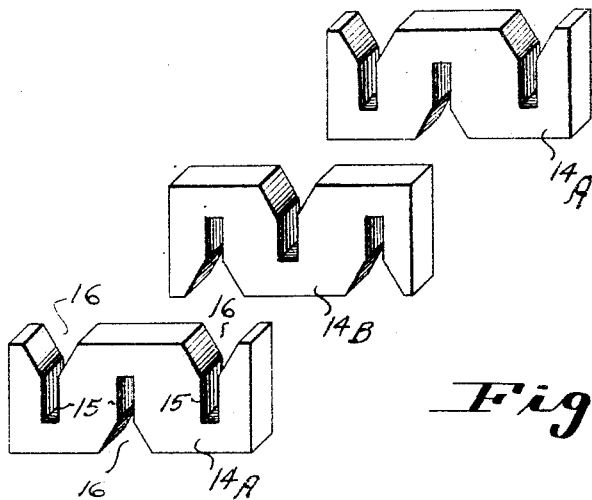
Fig. 1
Fig. 2
INVENTORS
Arthur S. Bassette
Andrew Kossuth
BY William A. Murphy
Daniel G. Cullen ATTORNEY.

Patented Feb. 4, 1941

2,230,423

UNITED STATES PATENT OFFICE 2,230,423

ELECTRICAL DISTRIBUTION SYSTEM

Arthur S. Bassette, Andrew Kossuth, and William A. Murphy, Detroit, Mich.

Application January 3, 1938, Serial No. 183,144

1 Claim. (Cl. 174—72)

This application relates to electrical distribution systems of the bus duct type comprising duct or casings in which are disposed and suitably supported electrical conductors such as bus bars.

In a prior patent relating to such systems, No. 2,116,676 of William H. Frank and Lawrence E. Fisher, dated May 10, 1938, there is discussed the problem presented by the arising of arcs and there were disclosed in that application arrangements for solving such problem, contemplating the use of supports so constructed as not to interfere or prevent arcs within the duct from coursing freely through the duct along the bus bars, in conjunction with an arc dissipating center for dissipating arcs at the terminals or free ends of the bus bars after the arcs had coursed along the bus bars to such free ends.

This application relates to the same problem and in general contemplates a solution of the problem along similar lines. Specifically, this application may be distinguished from the earlier application in that there is here disclosed a modified form of insulator support for the bus bars.

For an understanding of the bus supporting means of this application, reference may be had to the appended drawing disclosing the same. In the drawing, Fig. 1 shows the bus duct in transverse elevational section with the bus bars shown as supported upon an insulated support;

Fig. 2 shows a group of such supports in perspective;

Fig. 3 shows the duct in plan view.

Referring to the drawing, it will be observed that Figs. 1 and 3 show a sheet metal bus duct of quadrilateral cross section made up of complementary sections 10 joined at their flanges 11 by suitable means and containing three parallel longitudinally extending flat ribbon naked bus bars 12, adapted to be engaged by prongs, which may be inserted into the duct through longitudinally spaced access openings 13, for making contact with such prongs, it being understood that when prongs are withdrawn from the bus bars through such openings, arcs may and often do arise at the points of disengagement.

For supporting the bus bars there may be longitudinally spaced along the duct, closely fitting quadrilateral insulator supporting plates 14, each having slots 15 extending from opposite edges of the plate for forming close fitting seats into which the bus bars may be disposed.

All of the slots 15 are provided with wide tapering mouths 16 which permit a bus bar, as it passes through a plate, to have at least one narrow edge completely free, that is to say, not closely surrounded by a part of the plate. The other surfaces of the bus bar will be closely surrounded by the plate.

It is contemplated to dispose the plates, all of which are shown as identical, in the duct in two series; the plates of series A, of which two are shown in Fig. 2, will be disposed with their end slots facing up and their center slots facing down. The plates of series B, of which only one is shown in Fig. 2, will be disposed with their end slots facing down and their center slots facing up. The plates will be so disposed that between each pair of plates of one series there will be disposed one plate of the other series. The net result will be that the plates will be arranged with their corresponding slots reversed, that is to say, the slots of the plates receiving any one bus bar (for example the center slots receiving the center bus bar) are reversed, with the center slot of one plate opening up and the next plate center slot opening down.

The supporting arrangement herein shown will function to zig-zag the course of an arc coursing along a bus bar without, however, substantially impeding the coursing of the arc.

By way of example it will be observed that if an arc is formed along the center bus bar, on the withdrawal of a prong of a contact device, which prong was inserted into the duct through the center one of the prong openings 13, that such arc will course freely along the lower edge of that bus bar from a plate of series A up to the next plate, which is of series B, at which time the arc will zig-zag and travel along the upper edge of such bus bar, continuing along the upper edge to a plate of series A, then dropping to the lower edge. Arcs on the end bus bars will travel on the upper edges of these bus bars from the plates of series A to those of series B and on the lower edges of the bus bars from the plates of series B to those of series A; and arcs on the center bus bar will travel along the lower edge of the center bus bar from the plates of series A to those of series B and along the upper edges of the bus bars from the plates of series B to those of series A.

Now having described the invention hereof, reference should be had to the claim which follows for a determination of the scope of such invention.

We claim:

In combination, a quadrilateral cross section sheet metal duct for electrical distribution systems of the bus duct type, a longitudinally extending naked bus bar of flat ribbon form therein, the duct having in one or more sides longitudinally spaced openings through which may be plugged prongs for engaging and making contact with the bus bar, at which openings arcs arise when the prongs are withdrawn, and longitudinally spaced insulator supporting plates for the bus bar fitted closely within and arranged transversely of the duct, each having a narrow deep slot extending from one linear edge thereof for forming a seat into which the bus bar may be disposed, with a narrow edge against the base of the slot, adjacent plates being arranged with slots reversed, that is to say, the slot of one plate opening to one side of the duct, and the slot of the adjacent plate opening to the opposite side of the duct, whereby an arc formed on the bus bar can course along the bus bar edges, in a zig zag path, all of the slots and the bus bar therein lying in the same plane, the bus bar at any insulator being closely surrounded on an edge and two sides by that insulator.

ARTHUR S. BASSETTE.
ANDREW KOSSUTH.
WILLIAM A. MURPHY.